United States Patent [19]

Magrane

[11] Patent Number: 4,669,314
[45] Date of Patent: Jun. 2, 1987

[54] VARIABLE FOCUSING IN ULTRASOUND IMAGING USING NON-UNIFORM SAMPLING

[75] Inventor: Mark G. Magrane, Rancho Cordova, Calif.

[73] Assignee: General Electric Company, Milwaukee, Wis.

[21] Appl. No.: 794,095

[22] Filed: Oct. 31, 1985

[51] Int. Cl.⁴ .......................................... G01N 29/04
[52] U.S. Cl. ........................................ 73/610; 73/626
[58] Field of Search ................. 73/610, 612, 614, 615, 73/616, 626; 128/660

[56] References Cited

U.S. PATENT DOCUMENTS

| 4,105,018 | 8/1978 | Greenleaf et al. | 128/660 |
| 4,154,113 | 5/1979 | Engeler | 73/626 |
| 4,155,258 | 5/1979 | Engeler et al. | 73/626 |
| 4,155,260 | 5/1979 | Engeler et al. | 73/626 |
| 4,165,537 | 8/1979 | Engeler et al. | 365/45 |
| 4,168,629 | 9/1979 | Bulteel | 73/615 |
| 4,240,295 | 12/1980 | Uranishi | 128/660 |
| 4,448,201 | 5/1984 | Matsumoto | 128/660 |

*Primary Examiner*—Anthony V. Ciarlante
*Attorney, Agent, or Firm*—Flehr, Hohbach, Test, Albritton & Herbert

[57] ABSTRACT

Variable focusing in a phased array sector scanner is provided by selectively delaying the operation of a plurality of analog to digital converters thereby skewing sampled data. The skewed sampled data is then stored in a digital memory, and further focusing of the data is realized by selectively delaying the readout of data from the memories.

8 Claims, 3 Drawing Figures

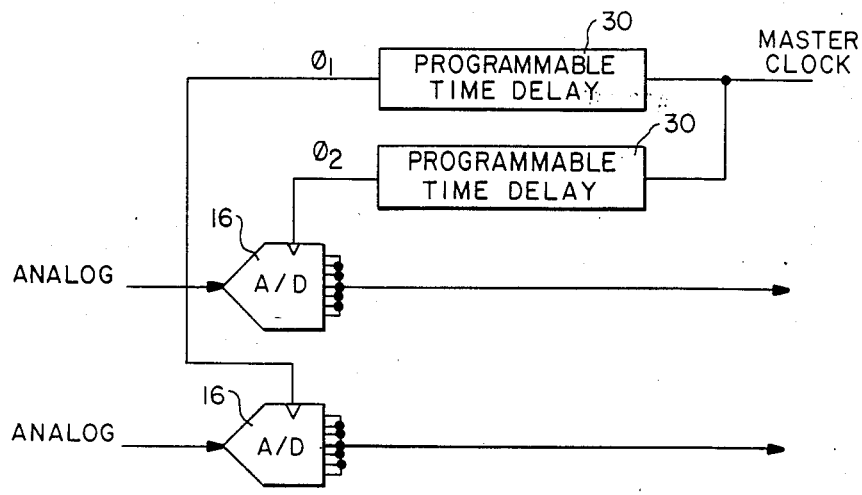
FIG.—2
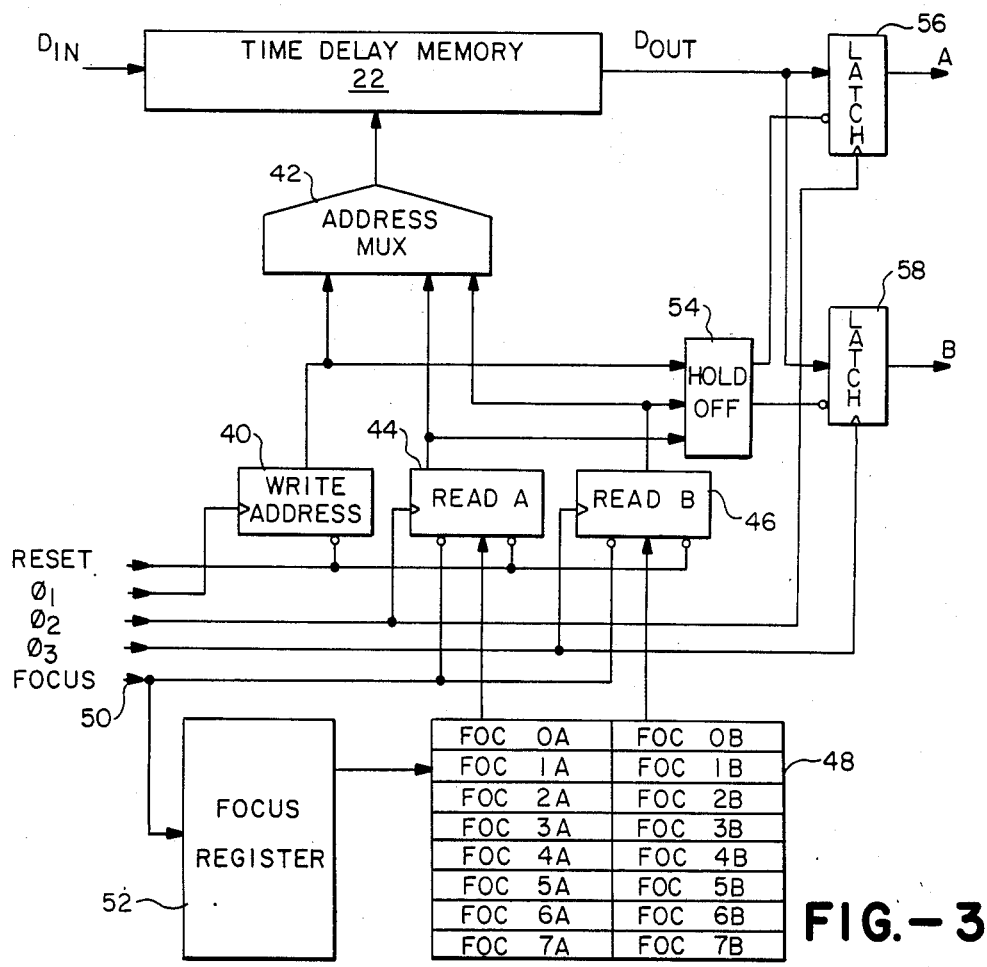
FIG.—3

VARIABLE FOCUSING IN ULTRASOUND IMAGING USING NON-UNIFORM SAMPLING

This invention relates generally to ultrasound imaging, and more particularly the invention relates to the variable focusing beam forming apparatus necessary to image formation.

Ultrasound imaging systems transmit ultrasonic waves into a volume to be imaged and receive reflected ultrasonic waves therefrom. The reflected ultrasonic waves are converted to electrical signals which are then processed for use in controlling a video display.

In a phased array sector scanner, ultrasonic waves are transmitted and received from multiple transducer elements. The quality of the electronic signal used to generate the image data depends on selective delaying of signals from the individual transmitting and receiving transducer elements and forming a single beam from a coherent summation of the respective element signals.

Analog processing has been used to accomplish the time resolution and accuracy needed for beam formation in the front end of phased array sector scanners. However, low bandwidth and impedance matching constraints are severe limitations in using analog time delays.

Kino et al. U.S. Pat. No. 4,324,257 propose an ultrasound imaging system in which time delays are performed digitally using shift registers. A limitation of this approach is the time delay resolution being equal to the sampling period since the time delay accuracy of the system is determined by the sampling array of the analog to digital converters.

Three major limitations to using digital delays have been:

(a) Delay Resolution. Analog to digital converters available for such a system sample at a rate of between 10 and 20 MHz resulting in time delay accuracies of between 50 and 100 nanoseconds. Such a level of accuracy is on the order of a magnitude less than that needed for beam forming in medical ultrasound imaging applications.

(b) Bandwidth. The bandwidth of the signal is limited to one-half the sampling rate of the analog to digital converter. Also, since the analog to digital converter has a finite setting time before a sample can be taken (referred to as the aperture time), the input signal is effectively averaged over this time, limiting its bandwidth.

(c) Cost. High speed analog to digital converters with 50 to 100 MHz sampling capabilities are far too expensive for any design to sell in the existing market-place.

In accordance with the present invention the time delays necessary in focusing of image data are decoupled from the sampling rate of the analog to digital converters through use of non-uniform sampling. The analog electrical signals generated by a transducer array in response to an ultrasonic wave reflection are optimized for processing by first translating the analog signals to lower frequencies using baseband signal processing, described by William Engeler, General Electric Company U.S. Pat. No. 4,155,259. Due to the translation of the acoustic bandwidth for a lower electrical bandwidth the limitation of aperture time integration is effectively eliminated when the electrical signal is applied to an analog to digital converter. Operation of the analog to digital converters is selectively delayed in accordance with a desired focusing. This phase compensation of the reflected signals can be accomplished with digitally programmable delay lines on each of the sample clocks to the analog to digital converters. By so skewing the clocks, the sample frequency to the analog to digital converter is dependent only on the bandwidth of the incoming signal. Accordingly, slower and thus less expensive analog to digital converters can be employed.

In a preferred embodiment the digital data output from the analog to digital converters is stored in digital memory means. The readout of the data from the digital memory can be selectively delayed to further provide a focusing of the image data. Advantageously, large time delays for focusing can be readily accomplished in the readout of data from the array while the finer phase delay for focusing is accomplished by skewing the operation of the analog to digital converters.

The invention and objects and features thereof will be more readily apparent from the following detailed description and appended claims when taken with the drawing, in which:

FIG. 2 is a functional block diagram of an analog to digital converter for use in the apparatus of FIG. 1.

FIG. 3 is a functional block diagram of a digital memory for use in the apparatus of FIG. 1.

Figure 1:
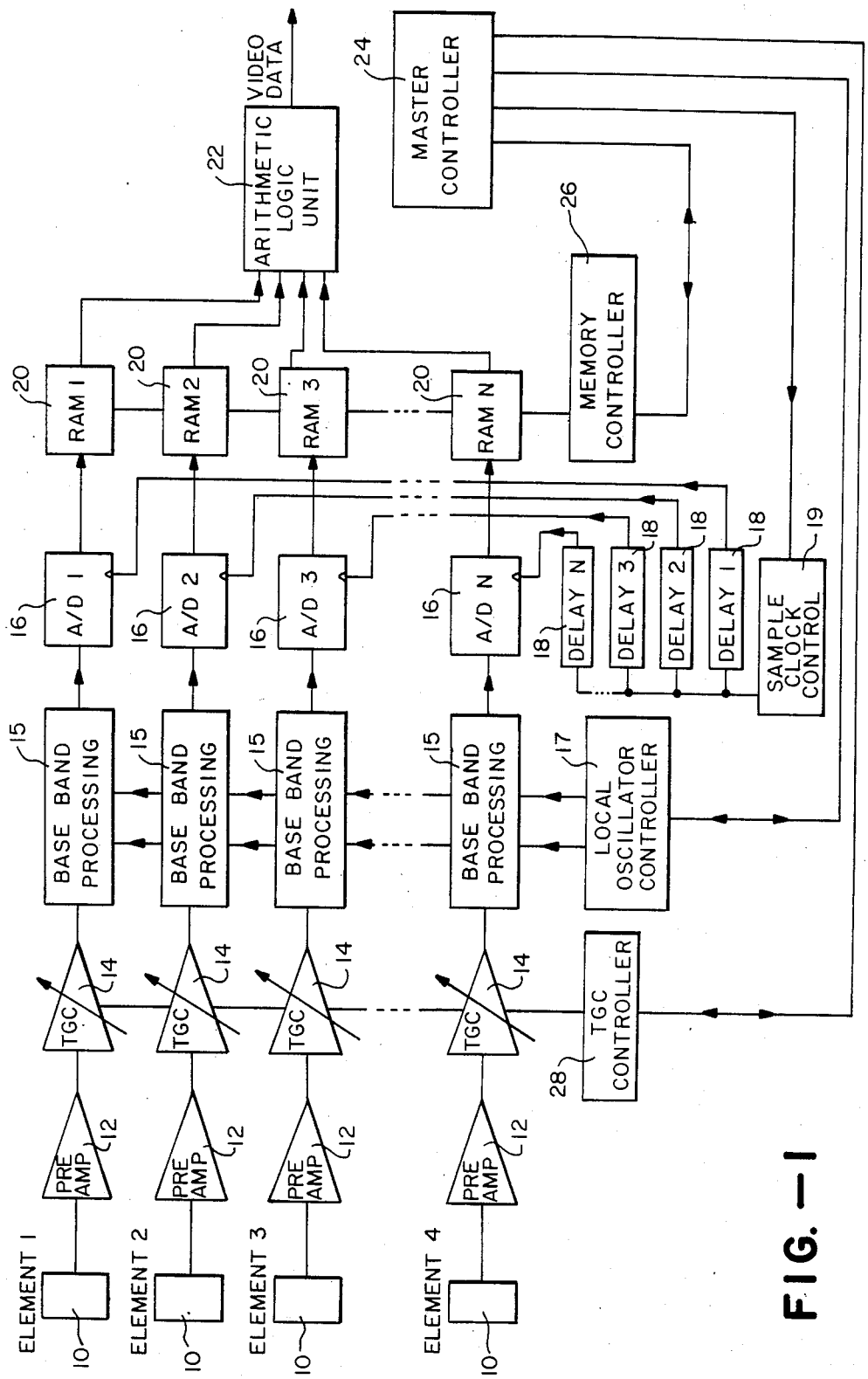
FIG. 1 is a functional block diagram of apparatus for focusing signals in an ultrasound phased array imaging system in accordance with one embodiment of the invention.

Referring now to the drawing, FIG. 1 is a functional block diagram of signal processing apparatus in a phased array sector scanner. A plurality of transducer elements 10 transmit and receive ultrasonic waves, and the analog electrical signals generated by each of the transducer elements 10 are applied through preamplifiers 12, time gain control amplifiers 14 and translated to baseband frequencies with the baseband local oscillators 15 to analog to digital converters 16. The analog to digital converters 16 operate in response to a sampling clock 18 for sampling the amplified analog signals and generating digital data in response thereto. The sampling rate of the converters must equal at least twice the highest frequency in the amplified analog signals. The digital data from converters 16 are then stored in random access memories 20, and the data from memories 20 are later read, summed, and processed in an arithmetic logic unit 22 for generating video signal data at 24. A master controller 24 controls the operation of ALU 22, memory controller 26, AGC controller 28 and baseband local oscillator controller 17.

FIG. 2 is a block diagram of two analog to digital converters 16 for use in the apparatus of FIG. 1. The master clock signals for controlling operation of the A/D converters 16 are applied through programmable delay lines 30. Thus, the sampling of analog signals by the converter 16 can be skewed as required for a particular image focus. Accordingly, the clock frequency for the A/D converters is independent of the delay interposed by the delay lines 30. Accordingly, the time delay is not restricted by the sample rate of the A/D converters.

FIG. 3 is a functional block diagram of a digital random access memory 22 for use in the apparatus of FIG. 1. Digital data from an A/D converter 16 is applied at the input of memory 22, and data is read from memory 22 at the output. In this embodiment data for two vectors can be stored in the memory. The writing of data into the memory occurs during a phase 1 time period, and the reading of vector data from the memory occurs during phase 2 and phase 3 time periods. During the write operation a write address 40 provides addresses through address multiplexer 42 to memory 22, and during the reading of data from memory 22 addresses are applied by read A address 44 and read B address 46 during phase 2 and phase 3, respectively, Importantly, the addresses from 44 and 46 can be controlled in response to a desired focus stored at 48. The focus responds to a control signal on line 50 which is received by register 52. For example, a desired focus from one vector can be achieved by selectively addressing the memory to read every address, every other address, or another selected sequence of addresses. The output from memory 22 is delayed by a HOLD OFF circuit 54 which controls latches 56 and 58 for the A vector and B vector outputs, respectively. Accordingly, data read from memory 22 is delayed by the HOLD OFF circuit 54 to provide focusing, and data is read from the memory 22 under control of the focus unit 48 to provide focusing.

Delay apparatus in accordance with the invention provides both a fine focus and course focus capability which is not restricted by the sampling rate of the analog to digital converters. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of focusing signals in a baseband ultrasound phased array imaging system comprising the steps of generating a plurality of analog electrical signals in response to an ultrasound wave received by an array of transducer elements, applying each analog signal to an analog to digital converter, selectively delaying operation of each analog to digital converter thereby skewing the outputs of said analog to digital converter for a desired focus, and summing said skewed signals.

2. A method of focusing signals in a baseband ultrasound phased array imaging system comprising the steps of generating a plurality of analog electrical signals in response to an ultrasound wave received by an array of transducer elements, applying each analog signal to an analog to digital converter, delaying operation of each analog to digital converter for a first selected time period and then sampling said analog signals at a sampling rate, storing sampled digital data output from each analog to digital converter in a digital memory, reading data from each digital memory after a second selected time period following storage of said data in said memory, and summing data from said digital memories.

3. The mtehod as defined by claim 2 wherein said first time period and said second time period are variable to vary the focusing of signals.

4. Apparatus for focusing signals in an ultrasound phased array imaging system comprising a linear array of transducer elements for generating a plurality of analog signals in response to an ultrasonic wave, analog to digital conversion means connected to receive said analog signals and generate digital data, said conversion means including means for selectively delaying operation for selected analog signals thereby skewing digital outputs, digital memory means connected to receive and store said digital data and read out stored digital data, said digital memory means including means for selectively delaying read out of digital data, and means for summing digital data read out from said digital memory means.

5. Apparatus as defined by claim 4 wherein one digital memory and one analog to digital converter is provided for each transducer element.

6. Apparatus as defined by claim 5 wherein each digital memory has storage capacity for a plurality of vectors whereby data for a plurality of vectors can be written sequentially and read sequentially from each memory.

7. Apparatus for focusing signals in an ultrasound phased array imaging system comprising a linear array of transducer elements for generating a plurality of analog signals in response to an ultrasonic wave, analog to digital conversion means connected to receive said analog signals and generate digital data, said conversion means including means for selectively delaying operation for selected analog signals thereby skewing digital outputs, digital memory means connected to receive and store said digital data and read out stored digital data, said digital memory means including means for selectively delaying read out of digital data, and means for summing digital data read out from said digital memory means.

8. Apparatus as defined by claim 7 and further including means for summing outputs of said analog to digital converters.

* * * * *